Feb. 16, 1932.  R. F. NOWALK  1,845,096
FRICTION EQUALIZING MATERIAL AND USE THEREOF
Original Filed Oct. 6, 1925
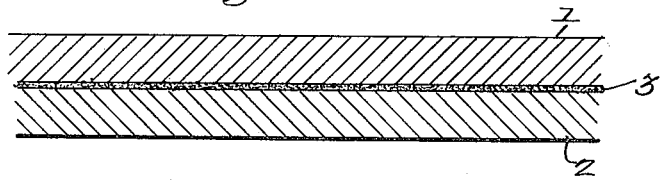
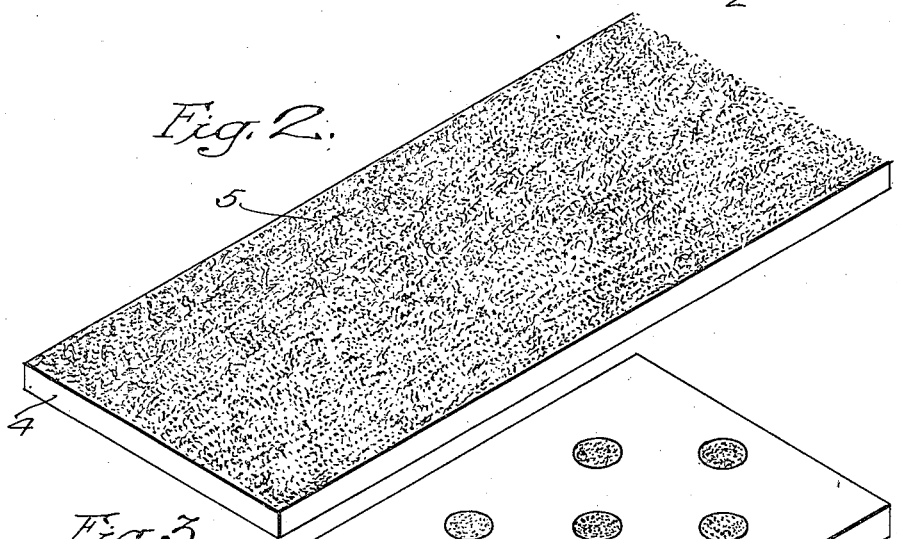
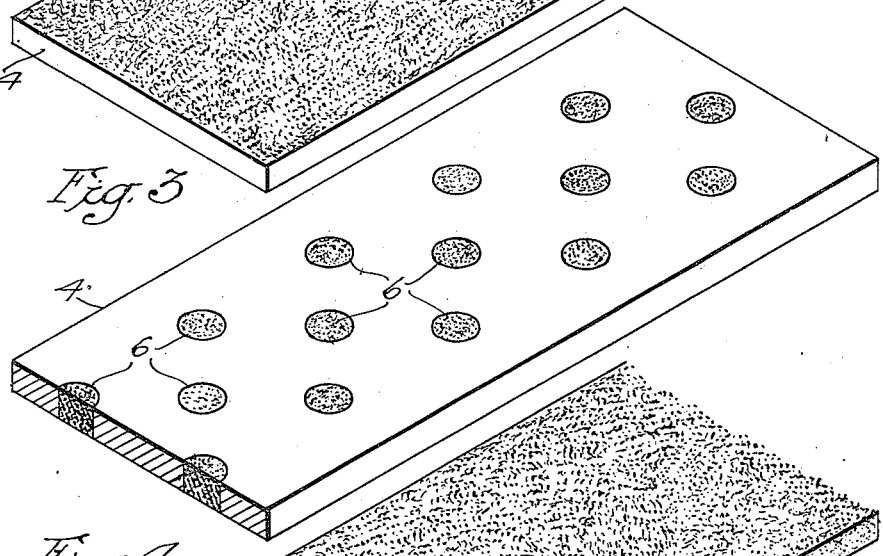
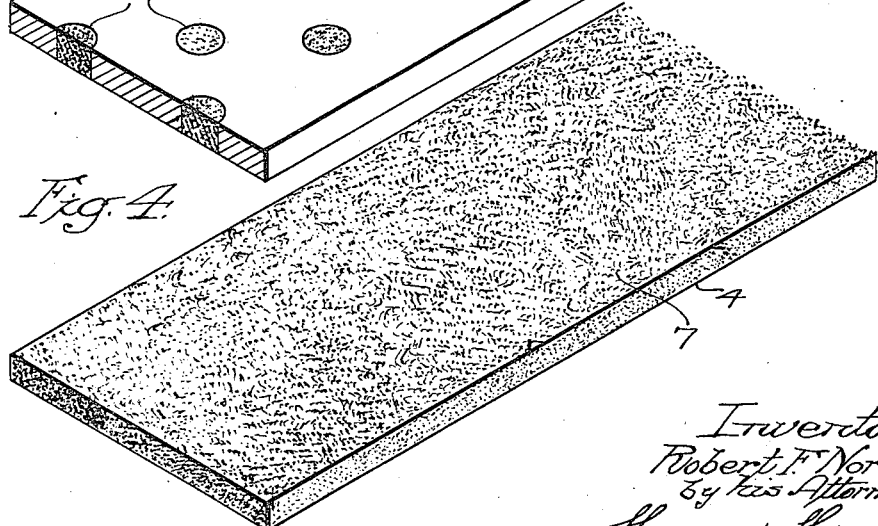
Inventor:
Robert F. Nowalk
by his Attorneys
Howson & Howson Patented Feb. 16, 1932

1,845,096

UNITED STATES PATENT OFFICE

ROBERT F. NOWALK, OF PHILADELPHIA, PENNSYLVANIA, ASSIGNOR TO JOHN WARREN WATSON COMPANY, OF PHILADELPHIA, PENNSYLVANIA, A CORPORATION OF PENNSYLVANIA

FRICTION EQUALIZING MATERIAL AND USE THEREOF

Original application filed October 6, 1925, Serial No. 60,929. Divided and this application filed October 8, 1929. Serial No. 398,266.

This invention relates primarily to friction equalizing materials for use in connection with shock absorbers, recoil checks, brakes and other energy dissipators as well as clutches and other energy transmitters and other mechanisms employing friction; and also to anti-squeak materials; and also to methods of use of such materials in conjunction with said mechanisms; and also to processes of manufacturing said materials. This application is filed as a division of my application for improvements in "the method of making friction equalizing materials", filed October 6, 1925, Serial Number 60,929.

The principal object of the invention is to provide novel and highly useful materials of the type set forth which may be used in friction devices for the purpose of satisfactorily equalizing the coefficients of friction between movable surfaces, as hereinafter fully set forth.

A further object is to provide novel means of storing, conserving and conveying the equalizing material in a manner to maintain a supply of the material at coactive friction surfaces.

The invention further resides in the novel form of and in the method of manufacturing said means of storing, conserving and conveying such materials.

Too great a variation between, for example, the static and running coefficients of friction between coacting friction surfaces results in spasmodic action which manifests itself in vibrations and noises. Heretofore, the attempts to overcome this spasmodic action, by other than mechanical means, has resulted in lowering, to too great an extent, the running coefficients of friction. I have succeeded in overcoming this spasmodic action by satisfactorily reducing the static coefficients without materially affecting the running coefficients of friction.

This is accomplished by having present at or between the coacting friction surfaces a material which in itself suitably equalizes the coefficients of friction, that is, makes the coefficients suitably equal or balanced regardless of whether the speed of relative movement is slow or fast, static or running.

I have discovered a class of substances which has in a marked degree all of the characteristics required for the stated purpose, and furthermore I have discovered a method of applying the material to the surface in such a manner that suitable results will be obtained. The class of substances known as soaps, embodying the soaps of the fatty acids, have special qualities when used as friction equalizing materials. I preferably use an insoluble soap of a fatty acid for I have found that in this form a particularly desirable material is obtained. In this class of substances one which is entirely satisfactory is calcium stearate. This may be used pure or with adulterations of fatty acids, waxes, and/or other soaps. For convenience of manipulation, I prefer and use a mixture of five parts of calcium stearate to one part of stearic acid. Stearic acid at an elevated temperature acts as a solvent for the calcium stearate, and by the use of this a homogeneous liquid is obtained which may be cast or which may be used to impregnate a matrix, as hereinafter described.

The calcium stearate may be used per se and good results will be obtained in equalizing the friction between movable surfaces. However in practice I have found it feasible to incorporate this equalizing material in a matrix in order to maintain a proper application of the material to the coacting friction surfaces. This matrix may be made up in various ways and used in various forms. For example, a fire brick or other naturally porous body may be used as the matrix and the equalizing material held by it.

In the accompanying drawings,

Figure 1 represents two relatively movable coacting surfaces 1 and 2 with the insoluble soap therebetween at 3;

Figure 2 is a perspective view of a member 4 with the insoluble soap shown on the surface thereof at 5;

Figure 3 is a similar view with inserts 6 placed in the member 4, said inserts serving as a carrier or matrix for the soap; and Figure 4 is a perspective view of a member 4 which itself is a matrix carrying the insoluble soap 7 which permeates it at least at a portion thereof intended for co-action with another member.

In a preferred procedure for making the calcium stearate mentioned above, I first take 200 lbs. of stearic acid, heat it until liquid and then thoroughly mix therewith, in finely divided form, 20 lbs. of calcium hydrate, or enough to bring about as complete a reaction as possible with the stearic acid. This mixture is kept heated with live steam in a jacketed kettle and churned for about three hours or until the reaction is judged, by the viscosity of the substance, to be practically complete and the water, formed by the reaction, driven off in the form of steam. The above process has resulted in the formation of the above mentioned calcium stearate which I have found to be a suitable friction equalizing material and which is a high coefficient lubricant. This stearate, while still in a viscous form, is poured into suitable molds, and later powdered.

In making up the impregnating bath, I place one part of stearic acid in the kettle and heat it until it becomes liquid and then I add five parts of the powdered stearate, gradually, until a thorough mixture or solution is obtained which is sufficiently liquid for impregnating purposes.

I now take 9 lbs. 10 ozs. of the prepared stearate and thoroughly mix therewith 9 lbs. of litharge, 30 lbs. of amorphous graphite, 7 lbs. 3 ozs. of borax and 9 lbs. 10 ozs. of English ball clay each of which is in a finely divided condition prior to their being mixed together. Then I gradually add 15 lbs. of water to which has been added 6 lbs. of glycerine. The mixing operation is continued for about one-half hour until the mixture becomes thoroughly homogeneous and of a consistency permitting it to be extruded, by means of a suitable core machine, in the form of rods, preferably hollow. If the mixture prior to its introduction into the core machine is too dry, a little water may be added. The rods are extruded onto corrugated trays and are thereafter placed on flat trays and cut into suitable lengths for the following operations. The next operation consists in heating the rods in a suitable oven or by other means to a temperature of about 212 to 225 deg. Fahrenheit, the temperature being maintained for about four hours until the rods become sufficiently dry and hard to be entirely self-sustaining. The rods are then packed in crucibles and heated to redness in a suitable furnace.

The red hot rods are now plunged into the aforedescribed impregnating bath consisting of the molten stearic acid and prepared calcium stearate and are allowed to soak until a thorough impregnation of the rods is assured. The capacity of the impregnator may be such that it will hold considerably more than the contents of the individual crucibles, and I have found a practical method to consist in successively plunging the red hot rods from the various crucibles into the impregnator until the capacity of the latter is reached, and then allow the entire number of rods to lie in the liquid for about four hours after the introduction of those last added. After the introduction of the initial batch of rods the steam heat may be eliminated as the heat of the rods themselves elevates the temperature of the impregnating bath and maintains it at the desired temperature during the impregnating operation. At the time the final batch of rods is added, the temperature of the bath is probably from 450 to 500 deg. Fahrenheit. After a lapse of time of four hours, as stated above, the rods may be removed from the bath and cooled, after which the excess impregnating material is scraped from the surfaces, and the rods, after being cut into suitable forms, are ready for use. The shavings of the impregnated material removed from the rods may be used in other compounding operations. By the above process I obtain a rod which in effect consists of amorphous graphite disseminated through and bonded by a slag or ceramic material and containing the friction equalizing material in the form of calcium stearate, or equivalent, with which the porous body is impregnated.

This product is particularly satisfactory in its use as an insert in friction devices in that it contains an equalizing material uniformly distributed throughout a matrix. The matrix is of ceramic material which resists crumbling and affords a relatively hard wearing surface. The thorough impregnation of the ceramic rod by the friction equalizing material insures that a supply of the aforesaid material will be maintained between or at coacting friction surfaces.

The matrix may be formed in any way and made of any suitable material or materials. In the above preferred example, the matrix consists of a ceramic material which was formed during the process by fusing together certain slag-forming ingredients. These ingredients may vary widely, but in general the formation of a slag or ceramic may be considered an interaction by fusion. In the present instance, the slag-forming constituents are found in the ball clay and borax. Obviously, however, limitless other slag-forming substances might be successfully employed as a matrix, and obviously also there are limitless other classes of materials which might be employed for my purposes generally without departing from the spirit and scope of my invention.

The porosity of the rod is obtained by the removal in the furnace of certain of the ingredients. Since a thorough intermixing is afforded in the compounding, this removal will leave the rod with numberless minute pores uniformly and completely distributed throughout the rod. The removal can be by volatilization as in the case of water and the like or may be by combustion. Various substances may be employed for the purpose. Organic compounds are especially adapted, for in the heat of the furnace they are burned away. Hydrocarbon oils, molasses, glue and fats are examples of this large class. The material added for this purpose may also serve as a binder for the materials in the compound and may be added to give the plasticity there required. In the specific example given, such a result is obtained because the water, glycerine, and stearate radical of the calcium stearate, are removed in the furnace to produce the desired porosity, while in the preliminary mixing and extruding they in conjunction with the litharge serve as binding materials.

Particular attention is called to the impregnating operation. By reason of the high temperature of the rods when plunged into the impregnating bath, the pores are readily filled, by capillarity, with the impregnating fluid. The relatively high temperature of the rods also acts favorably in that it renders the impregnating substance, immediately contacting the hot surfaces, readily fluid and easily absorbed. The fact that the rod is hollow also assists in the impregnating operation.

In the present instance, the impregnating bath is made up of the material which is to be used as the friction equalizing substance. As pointed out above, soaps of the fatty acids have been found to be of special value, particularly the insoluble soaps of these acids.

While I find it suitable to use graphite, other materials might be employed. I do not wish to limit myself to the particular ingredients herein set forth, nor to the stated proportions, nor to any one specific method as all may be varied widely without departing from the spirit and scope of my invention as set forth in the following claims.

I claim:

1. A friction equalizing material comprising a slag-bonded body permeated with a soap of a fatty acid.

2. A friction equalizing material comprising a slag-bonded body permeated with an inorganic soap of a fatty acid.

3. A friction equalizing material comprising a slag-bonded body permeated with an insoluble inorganic soap of a fatty acid.

4. A friction equalizing material comprising a slag-bonded body permeated with calcium stearate.

5. A friction member having an insoluble soap of a fatty acid at a surface thereof which is adapted for co-action with a relatively movable member whereby said friction member is rendered substantially free from causing spasmodic relative action with said relatively movable member regardless of the speed of their relative movement but provides a sufficiently high co-efficient of friction to furnish satisfactory resistance to their relative movement.

6. A friction member having calcium stearate at a surface thereof which is adapted for co-action with a relatively movable member whereby said friction member is rendered substantially free from causing spasmodic relative action with said relatively movable member regardless of the speed of their relative movement but provides a sufficiently high co-efficient of friction to furnish satisfactory resistance to their relative movement.

7. A friction member comprising a matrix carrying an insoluble soap of a fatty acid at a surface thereof which is adapted for co-action with a relatively movable member whereby said friction member is rendered substantially free from causing spasmodic relative action with said relatively movable member regardless of the speed of their relative movement but provides a sufficiently high co-efficient of friction to furnish satisfactory resistance to their relative movement.

8. A friction member comprising a matrix carrying calcium stearate at a surface thereof which is adapted for co-action with a relatively movable member whereby said friction member is rendered substantially free from causing spasmodic relative action with said relatively movable member regardless of the speed of their relative movement but provides a sufficiently high co-efficient of friction to furnish satisfactory resistance to their relative movement.

9. A friction member comprising a slag-bonded matrix carrying an insoluble soap of a fatty acid at a surface thereof which is adapted for co-action with a relatively movable member whereby said friction member is rendered substantially free from causing spasmodic relative action with said relatively movable member regardless of the speed of their relative movement but provides a sufficiently high co-efficient of friction to furnish satisfactory resistance to their relative movement.

10. A friction member comprising a slag-bonded matrix carrying calcium stearate at a surface thereof which is adapted for co-action with a relatively movable member whereby said friction member is rendered substantially free from causing spasmodic relative action with said relatively movable member regardless of the speed of their relative movement but provides a sufficiently high co-efficient of friction to furnish satisfactory resistance to their relative movement.

11. A friction member comprising a slag-bonded matrix containing graphite carrying an insoluble soap of a fatty acid at a surface thereof which is adapted for co-action with a relatively movable member whereby said friction member is rendered substantially free from causing spasmodic relative action with said relatively movable member regardless of the speed of their relative movement but provides a sufficiently high co-efficient of friction to furnish satisfactory resistance to their relative movement.

12. A friction member comprising a slag-bonded matrix containing graphite carrying calcium stearate at a surface thereof which is adapted for co-action with a relatively movable member whereby said friction member is rendered substantially free from causing spasmodic relative action with said relatively movable member regardless of the speed of their relative movement but provides a sufficiently high co-efficient of friction to furnish satisfactory resistance to their relative movement.

13. In resistance-producing mechanism, two relatively movable members in combination with a quantity of resistance-producing material comprising an insoluble soap of a fatty acid arranged to form a film between said members for producing resistance to their relative movement while also preventing spasmodic action between them during said movement.

14. In resistance-producing mechanism, two relatively movable members in combination with a quantity of resistance-producing material comprising calcium stearate arranged to form a film between said members for producing resistance to their relative movement while also preventing spasmodic action between them during said movement.

ROBERT F. NOWALK.